United States Patent [19]

Schmidt

[11] Patent Number: 4,570,760
[45] Date of Patent: Feb. 18, 1986

[54] APPARATUS FOR SEALING THE GUIDE PIN OF A FLOATING-CALIPER SPOT-TYPE DISC BRAKE

[75] Inventor: Herbert Schmidt, Frankfurt-Unter-Liederbach, Fed. Rep. of Germany

[73] Assignee: ITT Industries, Inc., New York, N.Y.

[21] Appl. No.: 553,092

[22] Filed: Nov. 18, 1983

[30] Foreign Application Priority Data

Nov. 26, 1982 [DE] Fed. Rep. of Germany ....... 3243851

[51] Int. Cl.[4] .............................................. F16D 65/09
[52] U.S. Cl. ................................... 188/73.44; 74/18.2; 188/73.31; 277/166; 277/212 FB; 403/50
[58] Field of Search .......................... 188/73.45–73.41, 188/73.34, 73.32, 370, 73.33, 73.31, 72.4, 71.1, 322.16–322.18; 277/212 FB, DIG. 4, 164, 237 A, 166, 157, 158; 74/18, 18.1, 18.2; 403/50, 51, 134; 92/168 B; 91/369 A, 369 B

[56] References Cited

U.S. PATENT DOCUMENTS

| | | | |
|---|---|---|---|
| 2,255,613 | 9/1941 | Fisher et al. | 277/49 |
| 3,326,562 | 6/1967 | Deuring | 277/164 X |
| 3,805,925 | 4/1974 | Schoenhenz | 188/73.45 |
| 4,133,542 | 1/1979 | Janian et al. | 277/164 X |
| 4,235,313 | 11/1980 | Hirashita | 188/73.44 |
| 4,267,904 | 5/1981 | Belart | 188/73.45 |
| 4,327,925 | 5/1982 | Alexander et al. | 74/18.2 X |

FOREIGN PATENT DOCUMENTS

| | | | |
|---|---|---|---|
| 0142465 | 11/1979 | Japan | 188/73.45 |
| 2120330 | 11/1983 | United Kingdom | 188/71.1 |

Primary Examiner—Duane A. Reger
Assistant Examiner—Michael P. Gilday
Attorney, Agent, or Firm—James B. Raden

[57] ABSTRACT

A floating-caliper spot-type disc brake whose caliper member is retained and guided on parallel pins clamped in the brake carrier member. A sealing boot is provided which protects the pins against moisture and dirt. One end of the sealing boot is armored by a crown spring having finger-shaped spring arms which firmly urge the one end against a part of the pin. A bellows portion succeeding the one end extends at right angles to the longitudinal axis of the pin and permits swivelling of the brake caliper relative to the brake carrier around one of both pins for a change of the pad without excess twisting of the sealing boot. The other end of the sealing boot is armored by a metal ring and engages with a groove which is provided at the open rim of the opening for the pin.

6 Claims, 4 Drawing Figures

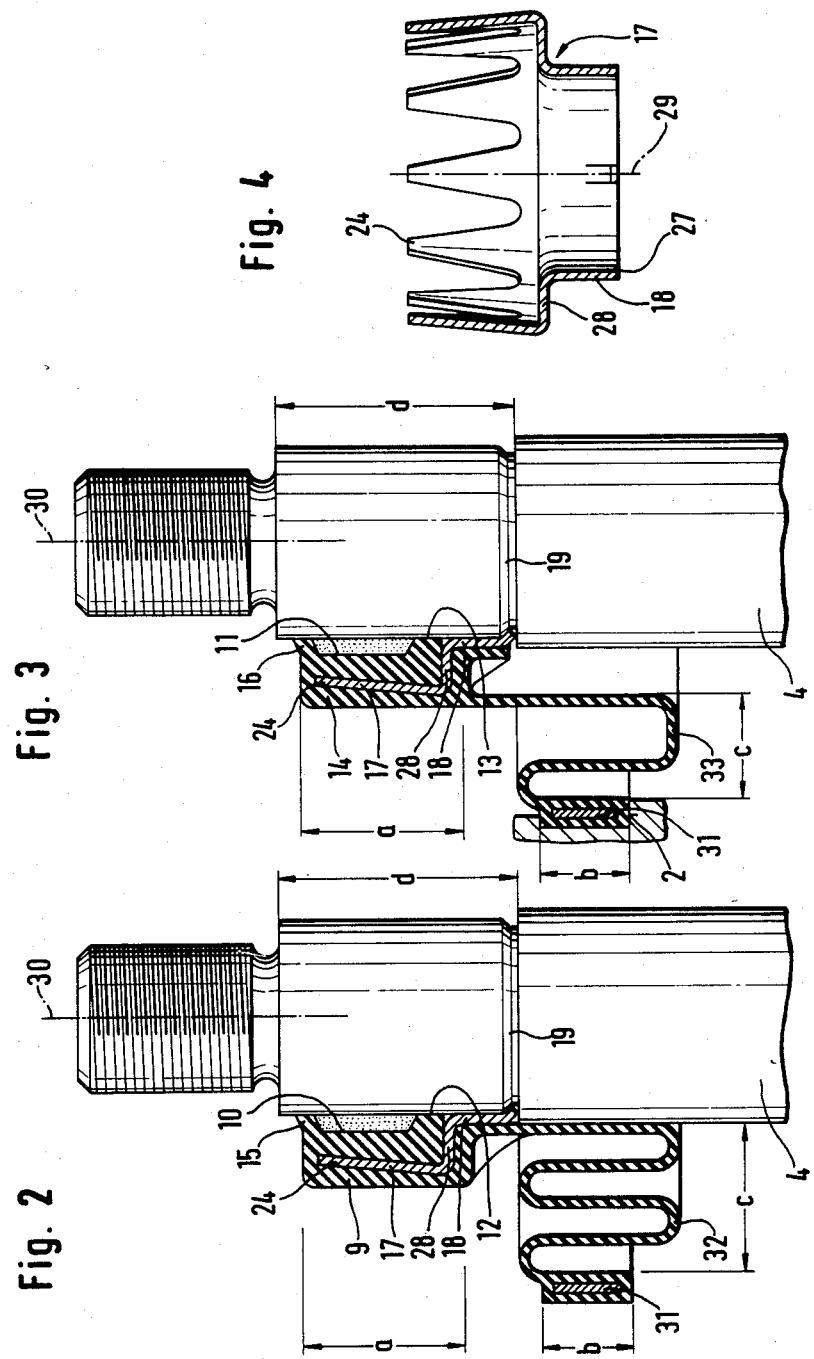

APPARATUS FOR SEALING THE GUIDE PIN OF A FLOATING-CALIPER SPOT-TYPE DISC BRAKE

BACKGROUND OF THE INVENTION

The invention is concerned with an arrangement for sealing the guide pin of a floating-caliper spot-type disc brake. The guide pin is fastened to the brake carrier member to join the carrier member to the brake caliper member. The guide pins are slidably received in an opening of the brake caliper member and threadedly connected to the brake carrier member. A sealing boot is retained at the open rim of the caliper member opening at its one end and tightly embraces the pin with its other end. A bellows portion of the boot interconnects both ends.

In a known disc brake of this type (German printed and published patent application No. 27 30 338), a sealing ring is fastened at the open rim of the opening, the internal circumference of said sealing ring having the shape of an elastically yielding lip seal which is tightly applied to the external cylindrical surface of the guide pin. An annular flange is provided at the guide pin outside the opening and the lip seal. The surface of the lip seal engages a portion of the sealing ring located at its opposite end.

However, experience has shown that the known arrangement of sealing means is not capable of permanently protecting the guide pin against the penetration of moisture and dirt.

Indeed, it has already been proposed (German patent specification No. 29 02 378) to shape the sealing boot as a bellows portion and to stiffen its ends with lip sealing rings by metal rings embracing that portion. However, that boot design has the disadvantage of not being suitable for spot-type disc brakes whose caliper members are being swivelled around one of the two pins for a change of the pads because the bellows portion is not sufficiently flexible for this purpose.

SUMMARY OF THE INVENTION

A major object of the invention is, therefore, to create an improved sealing means which enables rotating movement of one end of a sealing boot relative to the other end of the boot around the longitudinal axis of the pin. In addition, the improved sealing boot can be fitted into the comparatively narrow space between the clamping point of the pin and the brake portion guided on the pin. The resultant sealing means prevents the penetration of moisture, even under extreme conditions such as those which occur in off-highway vehicles.

According to the invention, the major object is achieved in that the end of the sealing boot which embraces the pin has a hollow cylindrical shape and is provided with a circumferential groove on its internal surface. The portion of the internal surface facing the fastening point of the pin forms a sealing lip which abuts against the pin. The end of the hollow cylindrical shape contains a crown spring partly enclosed by the material of the sealing boot. A spring collar of the spring is located concentrically with the pin and is retained in an annular groove of the pin to secure the end of the sealing boot against axial shift.

The crown spring which is partly enclosed by the material of the sealing boot preferably has a multitude of finger-shaped spring arms extending in the direction of the longitudinal axis of the pin. The free ends of the crown spring urge the sealing lip radially inwardly against the pin.

In order to ensure that the one end of the sealing boot does not shift on the pin, the crown spring is formed with a roughly cylindrical collar whose end points toward the bellows and projects from the sealing boot. The spring is radially inwardly flanged, the flanged edge engaging with an annular groove in the pin and fixing the sealing boot on the pin part.

The maximum inherent stability of the sealing boot is achieved by means of a flange portion with which the crown spring is formed and which connects the collar with the finger-shaped spring arms extending parallel to the axis of rotation of the crown spring. The flange portion extends in a plane at right angles to the axis of rotation and prevents a distortion of the sealing boot in the range of the circumferential groove which may be filled with grease.

The sealing boot is completely insensitive to a torsion of one clamping point relative to the other clamping point since the bellows portion of the sealing boot extends in a plane which is at right angles to the longitudinal axis of the pin and since the end of the sealing boot which is fixed at the open rim of the opening has a diameter larger than that of the portion which embraces the part of the pin.

In order to ensure a firm fit of the sealing boot in the area of the open rim of the opening, the end of the sealing boot preferably has embedded therein a metal ring, the axis of rotation of which extends concentrically with the longitudinal axis of the pin.

BRIEF DESCRIPTION OF THE DRAWINGS

The invention as disclosed may be conformed in a number of embodiments. Two of these are illustrated diagrammatically in the accompanying drawings.

FIGS. 2 and 3 are more detailed views of pin ends with the sealing boots fastened to them, partly in longitudinal section and in a greatly enlarged representation;

FIG. 4 is a longitudinal section through a crown spring of FIGS. 1–3 in a greatly enlarged representation.

DETAILED DESCRIPTION

Figure 1:
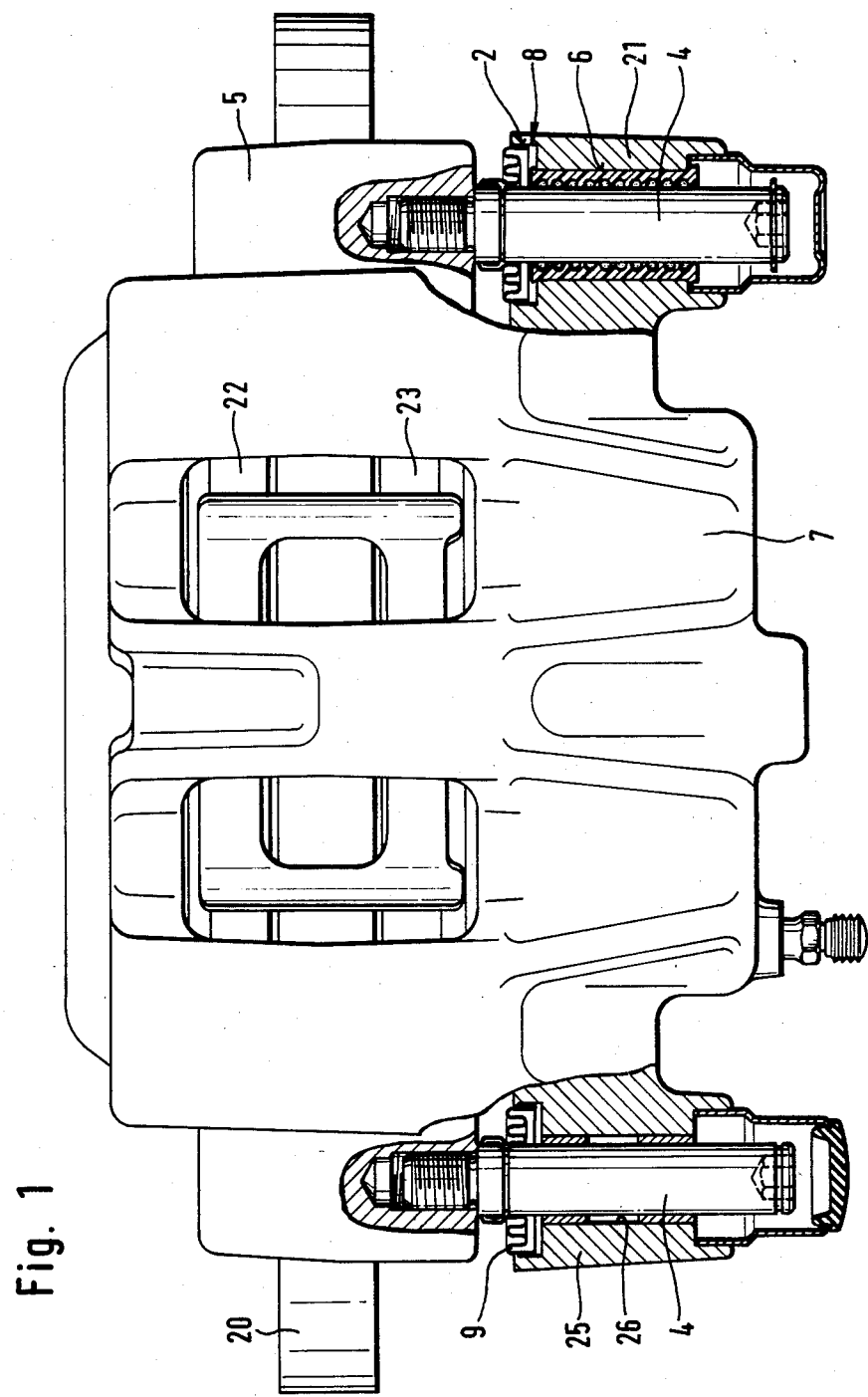
FIG. 1 is a plan view, partly in section, of a floating-caliper spot-type disc brake, the caliper member of which is swivelling relative to its brake carrier member around one of the pins.

The floating-caliper spot-type disc brake shown in FIG. 1 has a brake disc 20 rotating with the wheel of a vehicle. Self-supporting guide pins 4 are arranged at a brake carrier member 5 which is fastened to a vehicle element. A brake caliper member 7 serves to urge two friction pads 22 and 23 against the brake disc 20. In portions 21 and 25 of the brake caliper 7, openings 6 and 26 are provided into which the guide pin 4 protrudes so that the brake caliper is slidable along the guide pins 4 in the opening 6.

The essential elements of an arrangement of sealing means according to the invention are shown in FIGS. 2 and 4. The embodiment of FIG. 2 shows a sealing boot 9 comprising portions a, b and c whose sleeve-shaped portion a is formed with an annular groove 10 which is filled with grease. The sleeve portion firmly embraces and straddles part d of the pin 4. The necessary preload is applied to the sealing boot 9 by a crown spring 17 shown enlarged in FIG. 4 having spring arms 24 which are surrounded by the material of the sealing boot and firmly urge the sealing lip 15 at the end of portion a against the surface of the pin 4. In addition, the crown spring 17 has a narrower collar 18 which functions as a guide and centers the sealing boot 9 on part d of the pin 4 and ensures that portion a is not damaged when the sealing boot 9 is being mounted. The portion a is followed by the bellows portion c which permits swivelling of the caliper member 7, after removal of one of the pins 4, around the other pin 4 without an inadmissible twisting of the sealing boot 9. Furthermore, the bellows portion c extends in a plane which is at right angles to the longitudinal axis 30 of the pin 4 so that the sealing boot 9 can be produced in a particularly short design.

As shown in the embodiment of FIG. 3, only one single corrugation 33 may be provided in place of the several corrugations 32 of FIG. 2. The firm fit of portion a of the sealing boot 9 on the pin 4 at part d includes lip 16 and is also ensured in that the end of the collar 18 which points toward the bellows is radially inwardly flanged, with the flange edge 27 engaging with the annular groove 19. The flange portion 28 of the crown spring 17 safeguards that the portion a of the sealing boot 9, 14 in the range of the circumferential groove 11, which as mentioned, should be filled with grease. The boot is armoured in particular against external blows so that the grease filling is preserved for a long period of time.

The end b of the sealing boot 9 and 14 is designed in the shape of an annular cylinder, armoured by a metal ring 31 to engage with an annular groove 2 which is provided at the open rim 8 of the opening 6.

What is claimed is:

1. Apparatus for sealing the guide pin of a floating-caliper spot-type brake, in which the guide pin is fastened both to the brake carrier member and to the brake caliper member and is slidably received in an opening of the brake caliper and in which there is a sealing boot retained at the open rim of an opening in the brake caliper at one end of the boot and tightly embracing the pin at the other end, said boot comprising a bellows portion which interconnects both said ends, the invention in which the other end of the sealing boot which embraces the pin has a hollow cylindrical shape and is furnished with an annular groove on its internal surface, and in which an end portion of the internal surface of the other end of the sealing boot adjacent said annular groove forms a sealing lip which abuts against the pin, said other end of the sealing boot having a hollow cylindrical shape containing a crown spring partly enclosed by the material of the sealing boot, a collar of said spring located concentrically with the pin and being retained in an annular groove of the pin to secure the other end of the sealing boot against an axial shift.

2. Apparatus for sealing according to claim 1, in which the crown spring which is partly enclosed by the material of the sealing boot is formed with a plurality of finger-shaped spring arms extending in the direction of the longitudinal axis of the pin, the free ends of the arms urging the sealing lip radially inwardly against the pin.

3. Apparatus for sealing as defined in claim 1, in which the crown spring is formed with a roughly cylindrical collar with one end pointing toward the bellows and projecting from the sealing boot and a radially inwardly flanged edge of said spring engaging with the annular groove in the pin and fixing the sealing boot on a part of the pin.

4. Apparatus for sealing as claimed in claim 3, in which the crown spring is formed with a flange portion which connects the spring collar with integral finger-shaped spring arms extending generally parallel to the longitudinal axis of the crown spring, said flange portion extending in a plane at right angles to the axis of rotation and preventing a distortion of the sealing boot near the annular groove which is adapted to be filled with grease.

5. Apparatus for sealing as claimed in claim 1, in which the sealing boot has a bellows portion which extends in a plane which is at right angles to the longitudinal axis of the pin with the end of the sealing boot which is fixed at the open rim of the opening having a diameter larger than that of the boot portion which embraces the pin.

6. Apparatus for sealing as claimed in claim 1, in which the one end of the sealing boot embeds a metal ring, the longitudinal axis of which extends concentrically with the longitudinal axis of the pin.

* * * * *